(12) United States Patent
Lin

(10) Patent No.: US 7,280,846 B2
(45) Date of Patent: Oct. 9, 2007

(54) MOBILE PHONE WITH SIM CARD HOLDER

(75) Inventor: Yi Yen Lin, Taipei (TW)

(73) Assignee: BENQ Corporation, Taoyuan (TW)

( * ) Notice: Subject to any disclaimer, the term of this patent is extended or adjusted under 35 U.S.C. 154(b) by 217 days.

(21) Appl. No.: 10/738,430

(22) Filed: Dec. 17, 2003

(65) Prior Publication Data
US 2004/0132493 A1 Jul. 8, 2004

(30) Foreign Application Priority Data
Dec. 27, 2002 (TW) .............................. 91221335 U

(51) Int. Cl.
*H04B 1/38* (2006.01)
*H04M 1/00* (2006.01)
(52) U.S. Cl. ................ 455/558; 455/575.1; 455/575.2; 455/575.3; 455/575.4; 379/433.09
(58) Field of Classification Search ................ 455/558, 455/575.1–575.4; 379/433.09
See application file for complete search history.

(56) References Cited

U.S. PATENT DOCUMENTS 5,336,877 A * 8/1994 Raab et al. ................. 235/475
5,699,406 A * 12/1997 Liikanen et al. ............. 455/558
6,075,706 A * 6/2000 Learmonth et al. .......... 361/737
6,397,081 B1 * 5/2002 Franck et al. ................ 455/558
6,580,923 B1 * 6/2003 Kubo .......................... 455/558
6,665,544 B1 * 12/2003 Michel et al. ............... 455/558
2002/0094841 A1 * 7/2002 Sakaguchi et al. ........... 455/558
2002/0118826 A1 * 8/2002 Kiernan et al. .......... 379/433.09
2003/0227763 A1 * 12/2003 Kao et al. .................... 361/818

FOREIGN PATENT DOCUMENTS

EP 0 947 944 A2 * 6/1999

* cited by examiner

*Primary Examiner*—William Trost
*Assistant Examiner*—Ariel Balaoing
(74) *Attorney, Agent, or Firm*—Quintero Law Office

(57) ABSTRACT

A mobile phone with a SIM card holder. The mobile phone includes a body, a holder, and a SIM card. The body includes a first concave portion and a second concave portion. The holder is disposed in the first concave portion of the body in a method such that it is moved between a first position and a second position. The SIM card is disposed in the second concave portion of the body in a detachable method. When the SIM card is disposed in the second concave portion, it is abutted by the holder so that the holder is moved to the second position from the first position. When the SIM card is located in the second concave portion, the holder is located at the first position so as to fix the SIM card in the second concave portion.

20 Claims, 7 Drawing Sheets

MOBILE PHONE WITH SIM CARD HOLDER

BACKGROUND OF THE INVENTION

1. Field of the Invention

The invention relates to a mobile phone with a SIM (Subscriber Identity Module) card holder; in particular, to a mobile phone with a SIM card that can be conveniently replaced without damage.

2. Description of the Related Art

Recently, mobile phones have become so popular that one user may have several mobile phones sharing one SIM card that may be changed between the different mobile phones. Thus, providing a convenient method of fixing the SIM card in mobile phone is important. The conventional methods for fixing the SIM card can be substantially divided into two types.

The first method is performed using a fixed-typed SIM card holder. Specifically, after a surface, formed with pads, of the SIM card is aligned with a surface, formed with contacts, of a body of the mobile phone, the SIM card is pushed to a predetermined position on the body. Furthermore, after a battery is combined with the body of the mobile phone, the SIM card can be fixed by a rib on the battery to prevent the SIM card from slipping out during operation.

When the SIM card is pushed to the predetermined position on the body, however, the pads on the SIM card rub against the contacts on the body. Frequent exchange of a SIM card between phones results in damage to the plating layer on the pads of the SIM card.

The second method is performed by a moveable-type holder. Specifically, after the SIM card is disposed on a predetermined position of a body of the mobile phone, it is fixed by rotating or moving the holder. Although this method can effectively prevent the pads on the SIM card from sliding against the contacts of the body, it requires an additional step. Thus, it may be inconvenient for the user.

SUMMARY OF THE INVENTION

In view of this, the invention provides a mobile phone with a SIM card holder that simplifies the replacement of and avoids damage to the SIM card.

Accordingly, the invention provides a mobile phone with a SIM card holder. The mobile phone includes a body, a holder, and a SIM card. The body includes a first concave portion and a second concave portion. The holder is disposed in the first concave portion of the body in a method such that it is moved between a first position and a second position. The SIM card is disposed in the second concave portion of the body and is detachable. When the SIM card is disposed in the second concave portion, it is abutted by the holder so that the holder is moved to the second position from the first position. When the SIM card is located in the second concave portion, the holder is located at the first position so as to fix the SIM card in the second concave portion.

In a preferred embodiment, the body includes a first contact in the second concave portion, and the SIM card includes a second contact corresponding to the first contact. Thus, the SIM card is electrically connected to the body by the second contact contacting the first contact.

Furthermore, the first contact is an elastic member, and the SIM card is ejected from the second concave portion by the first contact when the holder is moved to the second position from the first position.

In another preferred embodiment, the depth of the first concave portion is shallower than that of the second concave portion.

In another preferred embodiment, the first concave portion is formed with a hole, and the holder includes a protrusion corresponding to the hole. Thus, the holder is fixed in the first concave portion by inserting the protrusion into the hole.

In another preferred embodiment, the body includes an abutting surface between the first concave portion and the second concave portion, and the holder includes an elastic portion corresponding to the abutting surface. Thus, the holder disposed in the first concave portion of the body is made moveable by the elastic portion abutting the abutting surface.

Furthermore, the holder includes an inclined surface opposite to a surface formed with the elastic portion.

In another preferred embodiment, the holder includes an inclined surface, and the inclined surface is abutted by the SIM card when the SIM card is externally disposed in the second concave portion.

In another preferred embodiment, the holder includes a release hole to assist in the movement of the holder.

BRIEF DESCRIPTION OF THE DRAWINGS

The present invention can be more fully understood by reading the subsequent detailed description and examples with references made to the accompanying drawings, wherein:

FIG. 1b is a top view of the mobile phone in FIG. 1a;

FIG. 2 is a perspective view of a body in FIG. 1a;

FIG. 3a and FIG. 3b are perspective views of a holder in FIG. 1a;

DETAILED DESCRIPTION OF THE INVENTION

Figure 1A:
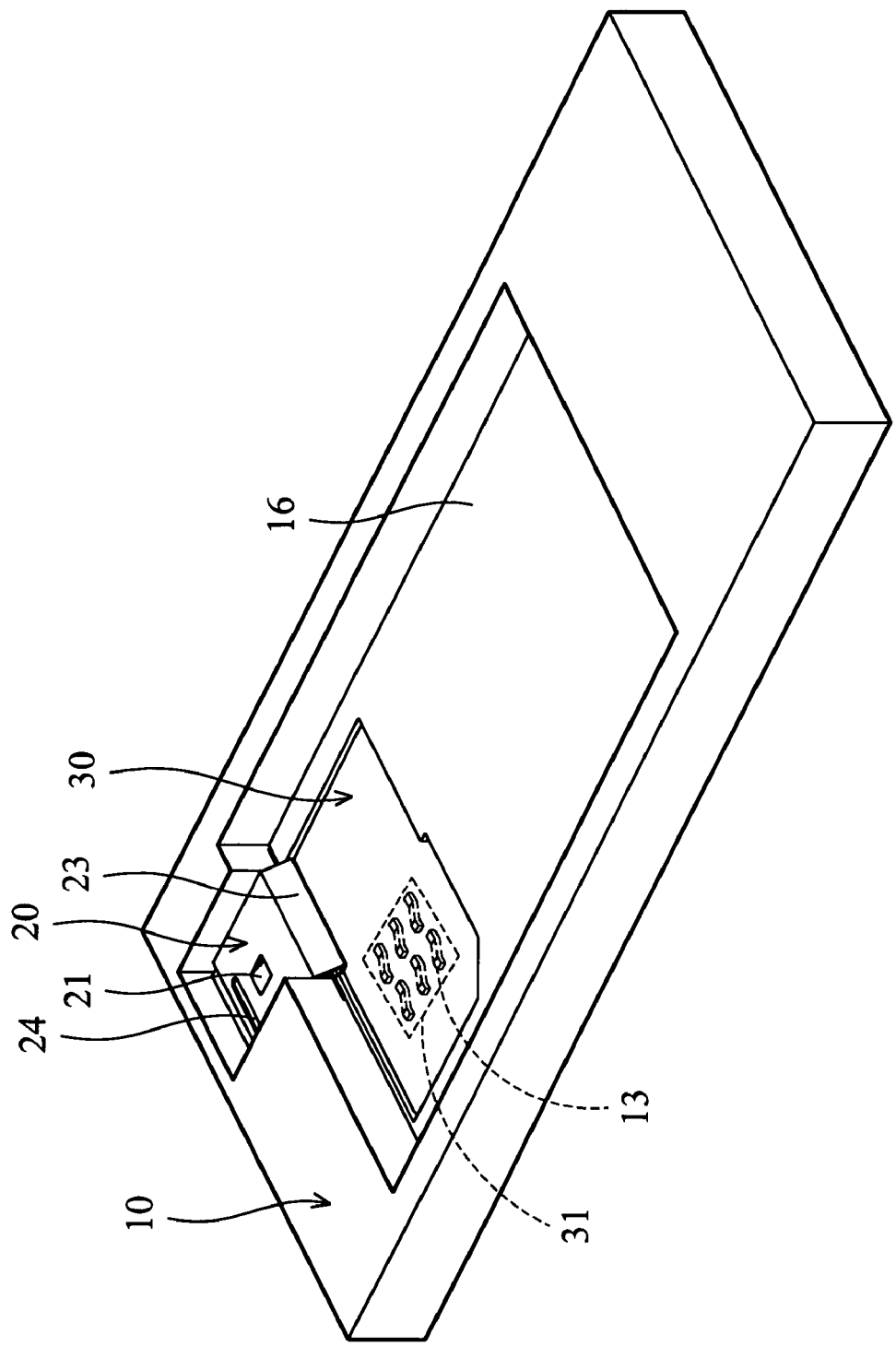
FIG. 1a is a perspective view of a mobile phone with a SIM card holder as disclosed in this invention.
Figure 1B:
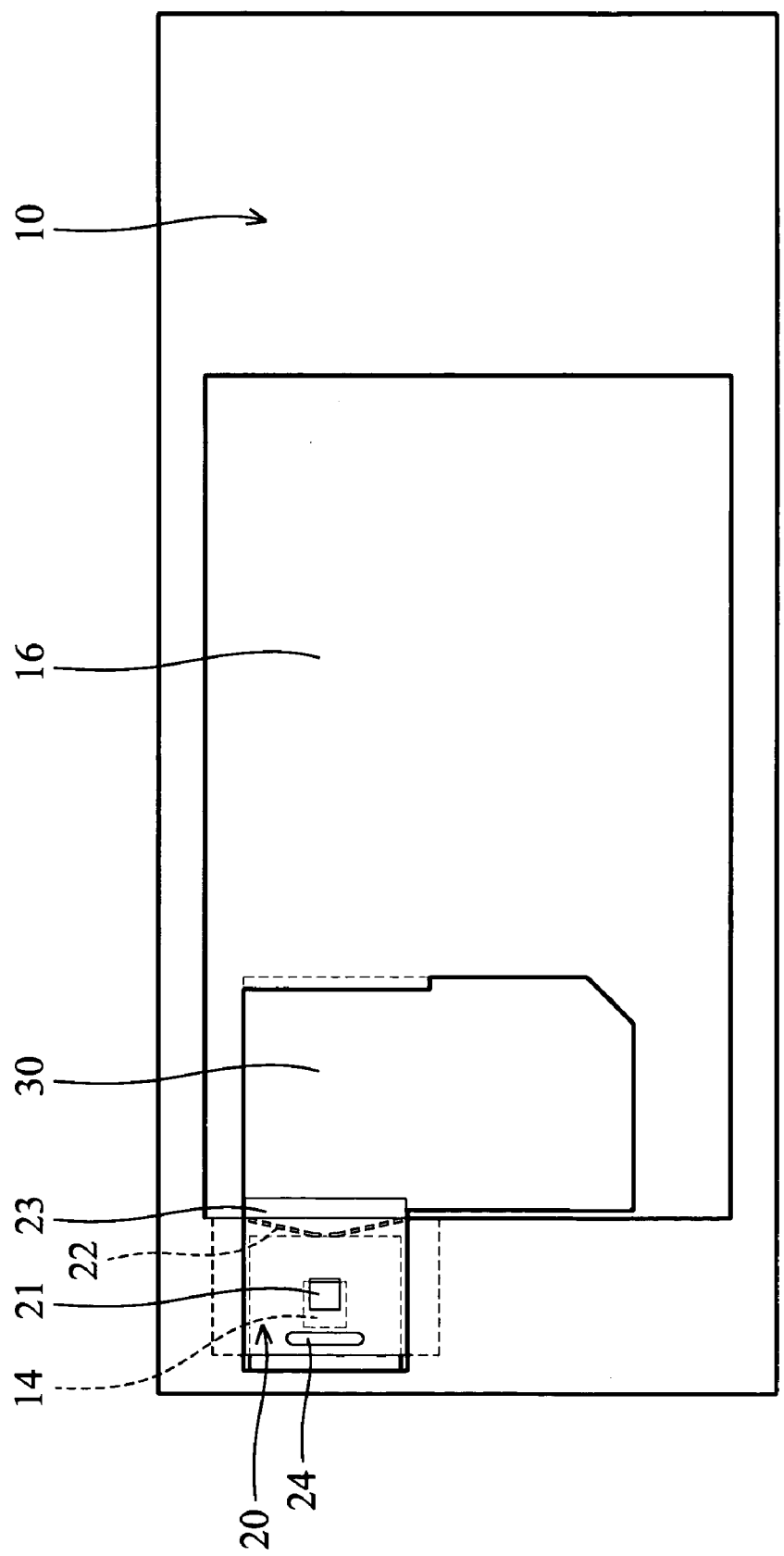

Referring to FIG. 1a and FIG. 1b, a mobile phone 100 with a SIM card holder as disclosed in this invention is provided. The mobile phone 100 includes a body 10, a holder 20, and a SIM card 30. It is noted that the actual mobile phone may further include a front case, a key, a panel, a battery, an antenna and other components. However, since such components are less related to this invention, they are not illustrated and their description is omitted.

Figure 2:
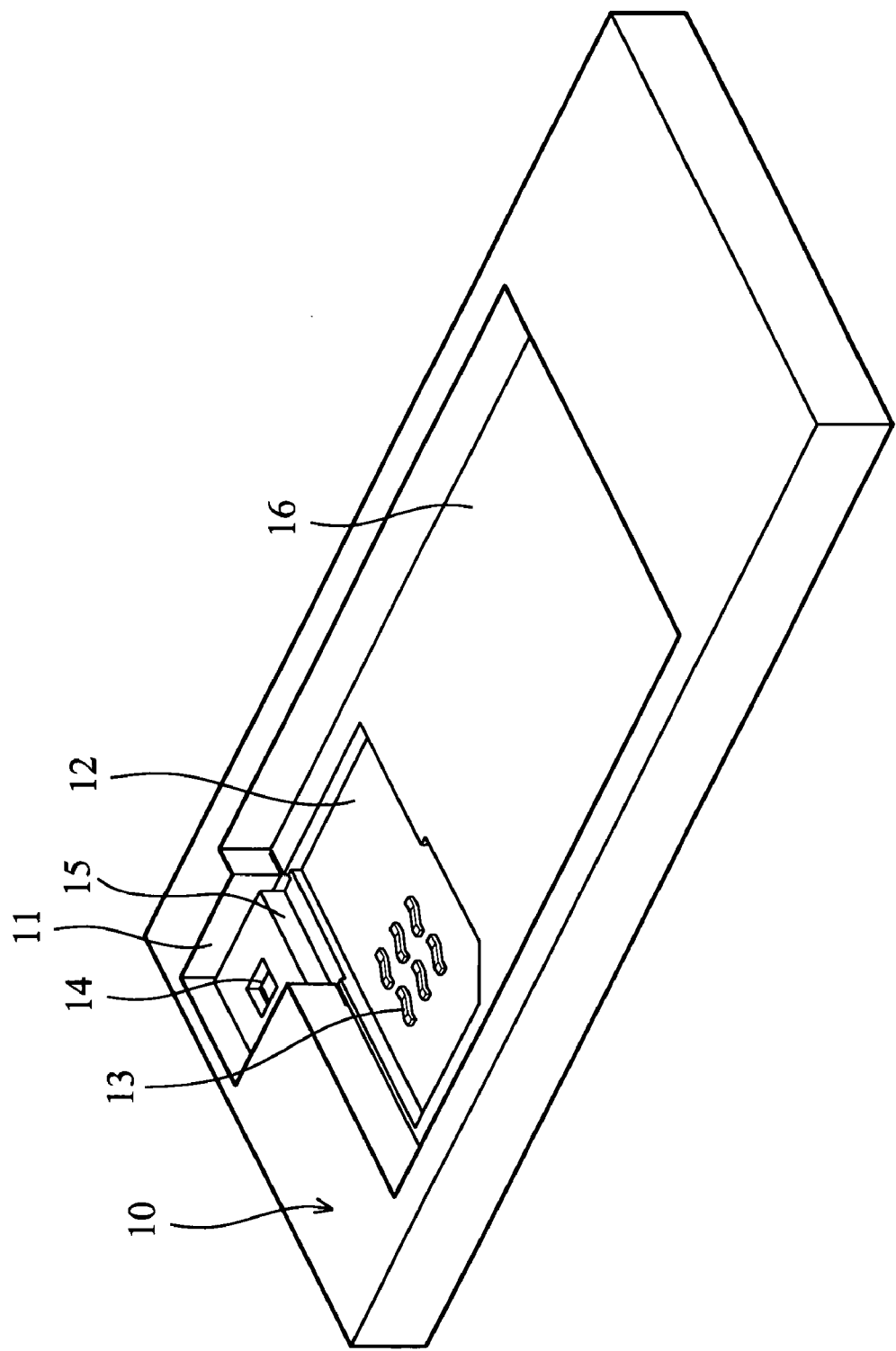

The body 10 is used as a rear case of the mobile phone 100 as shown in FIG. 2, and includes a first concave portion 11, a second concave portion 12, a plurality of first contacts 13, a hole 14, an abutting surface 15, and a receiving portion 16. The holder 20 is disposed in the first concave portion 11, and the SIM card 30 is disposed in the second concave portion 12. The depth of the first concave portion 11 is shallower than that of the second concave portion 12. The first concave portion 11 and the second concave portion 12 communicate with each other. The abutting surface 15 is formed between the first concave portion 11 and the second concave portion 12 by the difference in depth between the first concave portion 11 and the second concave portion 12.

Figure 3B:
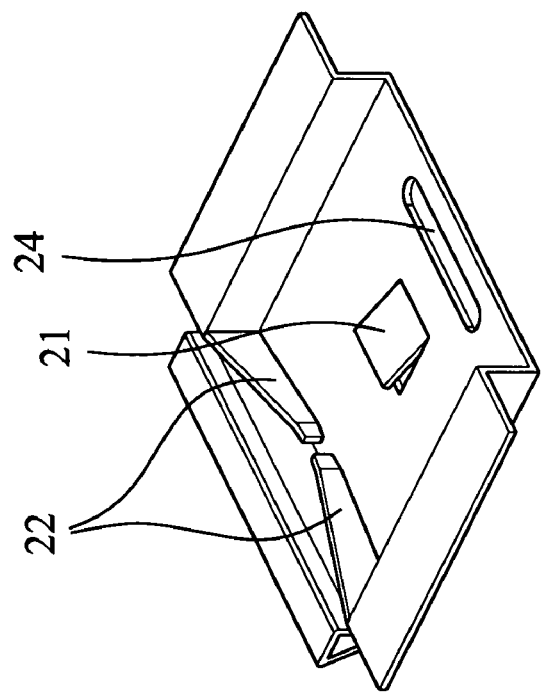
Figure 3A:
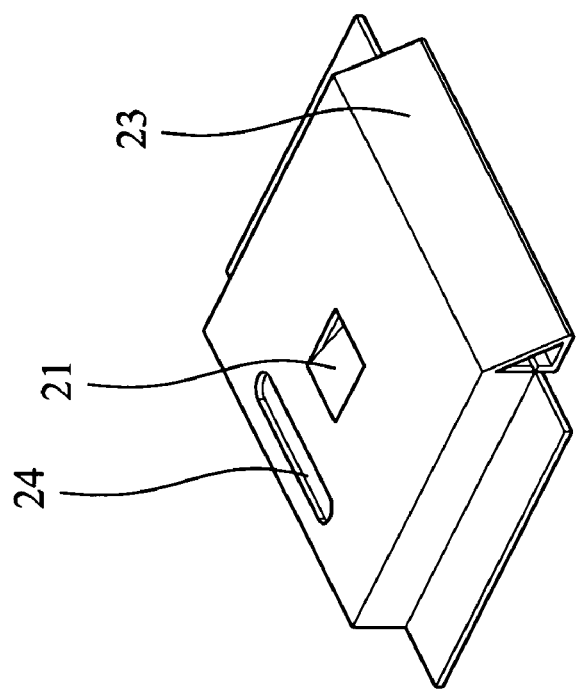
Figure 5A:
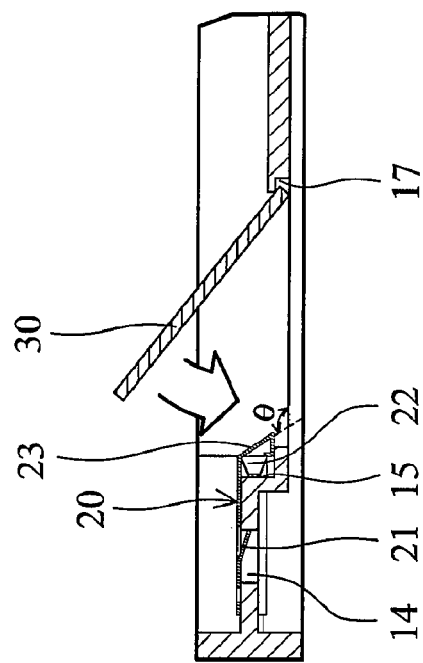
FIG. 5a, FIG. 5b, and FIG. 5c are schematic views showing that a SIM card as shown in FIG. 1a is disposed on the body.

The first contacts 13 are the connecting terminals formed on the body 10 to be electrically connected to the SIM card 30. The first contacts 13 are formed in the second concave portion 12. It is understood that each of the first contacts 13 may be an elastic member. The hole 14 is formed in the first concave portion 11. The receiving portion 16 receives the battery (not shown). The second concave portion 12 is formed in the receiving portion 16. The holder 20 is disposed in the first concave portion 11 of the body 10 in a method such that it is moved between an idle position (as shown in FIG. 5a and hereinafter referred as a first position) and a compressed position (as shown in FIG. 5b and hereinafter referred as a second position). As shown in FIG. 3a and FIG. 3b, the holder 20 includes a protrusion 21, two elastic portions 22, an inclined surface 23, and a release hole 24. An obtuse angle θ is formed between the inclined surface 23 and the first concave portion 11 (or the body 10).

The protrusion 21 corresponds to the hole 14 of the body 10. As shown in FIG. 1b, the holder 20 is fixed in the first concave portion 11 of the body 10 by inserting the protrusion 21 into the hole 14. It is noted that the protrusion 21 is elastic so that it may be conveniently assembled or disassembled from the hole 14. The elastic portion 22 corresponds to the abutting surface 15 of the body 10. As shown in FIG. 5a, the holder 20 is disposed in the first concave portion 11 of the body 10 in a moveable method by the elastic portion 22 abutting the abutting surface 15.

The inclined surface 23 is located on a surface opposite to a surface formed with the elastic portion 22. As shown in FIG. 5b, when the SIM card 30 is disposed in the second concave portion 12 of the body 10 from the outside, it is abutted by the inclined surface 23. The release hole 24 is used to assist in the movement of the holder 20. That is, when the user wants to move the holder 20, an external member can be inserted into the release hole 24 to perform the above process.

The SIM card 30 is disposed in the second concave portion 12 of the body 10 in a detachable method. The SIM card 30 includes a plurality of second contacts (pads) 31 corresponding to the first contacts 13 of the body 10. As shown in FIG. 1a, the SIM card 30 is electrically connected to the body 10 by the second contacts 31 contacting the first contacts 13.

The structure of the mobile phone of this invention is described as above, and the operation of the mobile phone is described below.

Figure 4A:
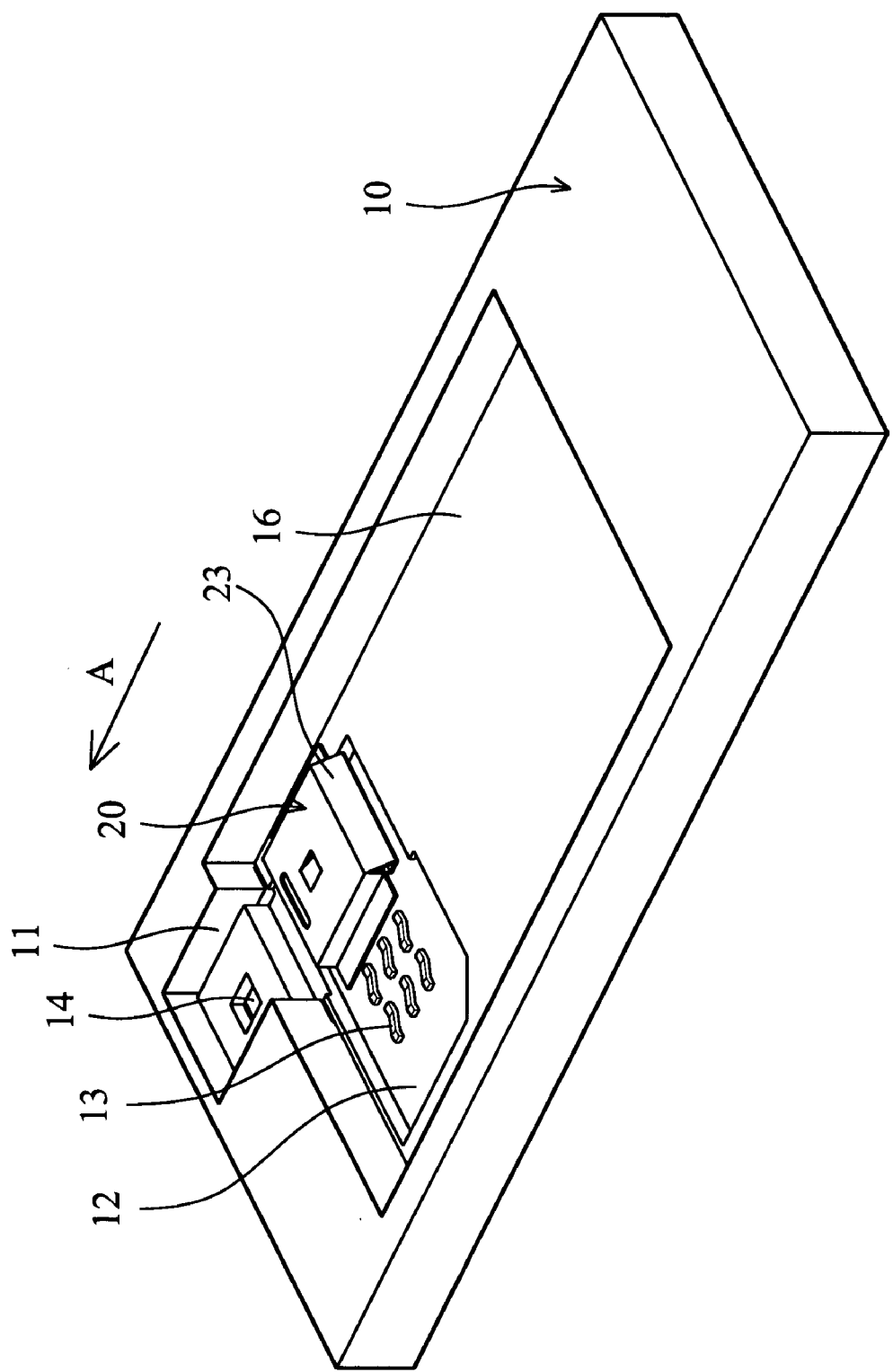
FIG. 4a and FIG. 4b are schematic views showing that the holder is assembled on the body.
Figure 4B:
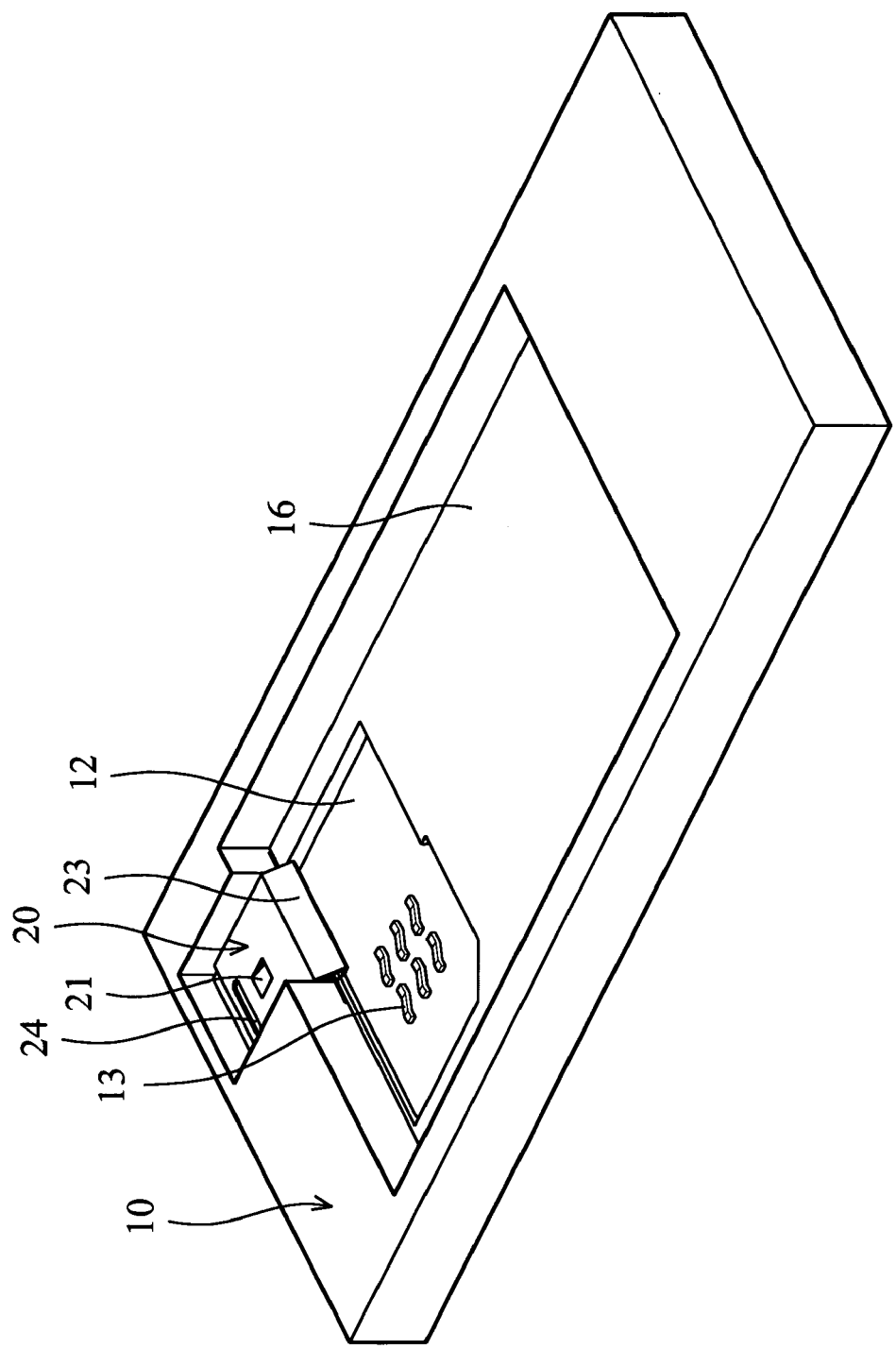

First, referring to FIG. 4a and FIG. 4b, the process of placing the holder 20 in the first concave portion 11 of the body 10 is described. The holder 20 is aligned with the first concave portion 11 as shown in FIG. 4a. It is noted that the inclined surface 23 does not face the first concave portion 11. Then, the holder 20 is moved along an arrow A in FIG. 4a until the protrusion 21 is inserted into the hole 14 of the body 10. At this time, the holder 20 is fixed in the first concave portion 11 as shown in FIG. 4b, and the elastic portions 22 are abutted by the abutting surface 15.

Figure 5C:
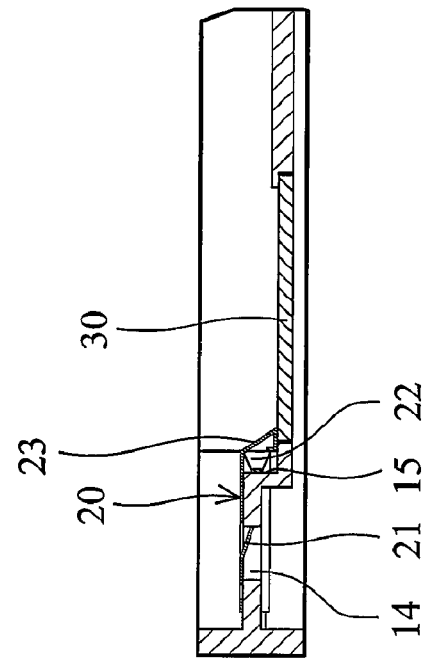
Figure 5B:
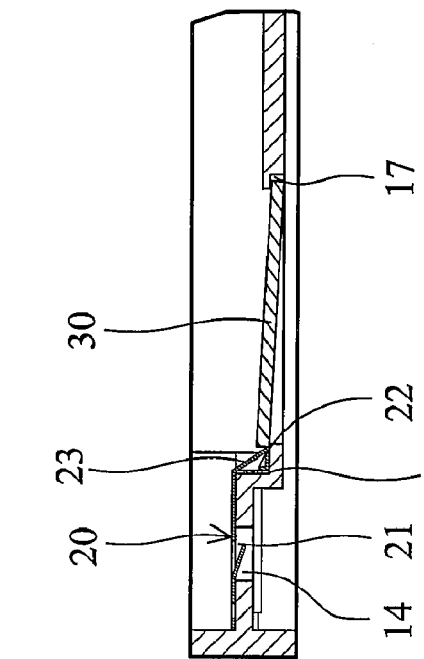

Second, referring to FIG. 5a, FIG. 5b, and FIG. 5c, the process about how to dispose the SIM card 30 in the second concave portion 12 of the body 10 is described. The SIM card 30 is firstly abutted by an abutting side 17 of the second concave portion 12 at one side as shown in FIG. 5a. Then, the SIM card 30 is rotated in a counterclockwise direction about the abutting side 17 so as to be abutted by the inclined surface 23 of the holder 20 at another side as shown in FIG. 5b. That is, the holder 20 is moved to the second position from the first position. Finally, when the SIM card 30 is located in the second concave portion 12, the holder 20 is returned to the first position so as to position the SIM card 30 in the second concave portion 12 as shown in FIG. 5c. At this time, the holder 20 may be abutted by the SIM card 30.

To remove the SIM card 30 from the body 10, the holder 20 is moved to the second position from the first position via the release hole 24 so that the holder 20 is not abutted by the SIM card 30. At this time, the SIM card 30 can be ejected from the second concave portion 12 by the elasticity of the first contacts 13.

As stated above, the SIM card of this invention is fixed by an additional holder. Since the body of this invention is provided with the concave portions, the holder can be properly assembled on the body. Furthermore, when the SIM card is disposed in the body, the SIM card is abutted by the inclined surface of the holder at one side so as to move the holder to the second position. After the SIM card is completely fixed, the holder can be automatically returned to the first position by the elastic portion of the holder. In addition, since the protrusion of the holder corresponds to the hole of the body, the holder cannot be ejected from the concave portion of the body. The holder can be conveniently moved by the release hole to remove the SIM card.

In summary, the SIM card can be properly fixed while it is fixed. Thus, it is very convenient for users. In addition, since the contacts of the SIM card do not slide against the contacts of the body, the plating layer of the contacts will not be damaged. Furthermore, by means of the release hole, the SIM card can be conveniently removed.

While the invention has been described by way of example and in terms of the preferred embodiment, it is to be understood that the invention is not limited to the disclosed embodiment. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A mobile phone with a SIM card holder, comprising:
   a body including a first concave portion and a second concave portion;
   a sliding holder, disposed in the first concave portion of the body, comprising an inclined surface, wherein an obtuse angle is formed between the inclined surface and the first concave portion, and the holder is slidable between a first position overlapping the second concave portion and a second position not overlapping the second concave portion; and
   a SIM card removably disposable in the second concave portion of the body, wherein the SIM card is abutted by the inclined surface of the holder so that the holder is slid to the second position form the first position during the disposition of the SIM card in the second concave, and the holder returns from the second position to the first position so as to fix the SIM card in the second concave portion when the SIM card is located in the second concave portion.

2. The mobile phone as claimed in claim 1, wherein the body includes a first contact in the second concave portion, and the SIM card includes a second contact corresponding to the first contact, whereby the SIM card is electrically connected to the body by the second contact contacting the first contact.

3. The mobile phone as claimed in claim 2, wherein the first contact is an elastic member, and the SIM card is ejected from the second concave portion by the first contact when the holder is moved to the second position from the first position.

4. The mobile phone as claimed in claim 1, wherein the depth of the first concave portion is shallower than that of the second concave portion.

5. The mobile phone as claimed in claim 1, wherein the first concave portion is formed with a hole and the holder includes a protrusion corresponding to the hole, whereby the holder is fixed in the first concave portion by inserting the protrusion into the hole.

6. The mobile phone as claimed in claim 1, wherein the body includes an abutting surface between the first concave portion and the second concave portion, and the holder includes an elastic portion corresponding to the abutting surface, whereby the holder is disposed in the first concave portion of the body in a moveable method by the elastic portion abutting the abutting surface.

7. The mobile phone as claimed in claim 6, wherein the inclined surface is opposite to a surface formed with the elastic portion.

8. The mobile phone as claimed in claim 1, wherein the holder includes a release hole to assist in the movement of the holder.

9. A mobile phone with a SIM card holder, comprising:
 a body;
 a sliding holder, disposed on the body, comprising an inclined surface, wherein an obtuse angle is formed between the inclined surface and the body, and the holder is slidable between a first position and a second position; and
 a SIM card removably disposable on the body, wherein the SIM card is abutted by the inclined surface of the holder so that the holder is slid to the second position from the first position so as not to overlap the SIM card during disposition of the SIM card on the body, and the holder returns from the second position to the first position to the first position to overlap the SIM card so as to fix the SIM card on the body when the SIM card is located on the body.

10. The mobile phone as claimed in claim 9, wherein the body includes a first concave portion, and the holder is disposed therein.

11. The mobile phone as claimed in claim 10, wherein the first concave portion is formed with a hole and the holder includes a protrusion corresponding to the hole, whereby the holder is fixed in the first concave portion by inserting the protrusion into the hole.

12. The mobile phone as claimed in claim 10, wherein the body includes a second concave portion for receiving the SIM card therein, and the depth of the first concave portion is shallower than that of the second concave portion.

13. The mobile phone as claimed in claim 12, wherein the body includes a first contact in the second concave portion, and the SIM card includes a second contact corresponding to the first contact, whereby the SIM card is electrically connected to the body by the second contact contacting the first contact.

14. The mobile phone as claimed in claim 13, wherein the first contact is an elastic member, and the SIM card is ejected from the second concave portion by the first contact when the holder is moved to the second position from the first position.

15. The mobile phone as claimed in claim 12, wherein the body includes an abutting surface between the first concave portion and the second concave portion, and the holder includes an elastic portion corresponding to the abutting surface, whereby the holder is disposed in the first concave portion of the body in a moveable manner by the elastic portion abutting the abutting surface.

16. The mobile phone as claimed in claim 15, wherein the inclined surface is opposite to a surface formed with the elastic portion.

17. The mobile phone as claimed in claim 9, wherein the inclined surface is abutted by the SIM card when the SIM card is externally disposed on the body.

18. The mobile phone as claimed in claim 9, wherein the holder includes a release hole to assist in the movement of the holder.

19. The mobile phone as claimed in claim 1, wherein the body includes an abutting surface between the first concave portion and the second concave portion, and the holder includes an elastic member corresponding to the abutting surface, wherein the elastic member is compressed against the abutting surface by movement of the holder from the first position to the second position, and elastic force from the compressed elastic member returns the holder from the second position to the first position when the holder is released while in the second position.

20. The mobile phone as claimed in claim 12, wherein the body includes an abutting surface between the first concave portion and the second concave portion, and the holder includes an elastic member corresponding to the abutting surface, wherein the elastic member is compressed against the abutting surface by movement of the holder from the first position to the second position, and elastic force from the compressed elastic member returns the holder from the second position to the first position when the holder is released while in the second position.

* * * * *